United States Patent

Berthier et al.

[11] Patent Number: 5,942,458
[45] Date of Patent: Aug. 24, 1999

[54] REGENERATION OF SPENT AS-POISONED LEAD CATALYSTS

[75] Inventors: Paul Berthier, La Garde Adhemar; Jean-Paul Bournonville, Rousson; Christian Ladirat, Saint-Laurent des Arbres; Bernard Nocher, La Celle Saint Cloud, all of France

[73] Assignee: Procatalyse, Rueil Malmaison, France

[21] Appl. No.: 08/909,657

[22] Filed: Aug. 12, 1997

[30] Foreign Application Priority Data

Aug. 12, 1996 [FR] France ................................. 96 10108

[51] Int. Cl.$^6$ .............................. B01J 20/34; B01J 38/04; B01J 38/10; B01J 38/02
[52] U.S. Cl. ................................ 502/56; 502/20; 502/34; 502/53
[58] Field of Search ................................ 502/20, 34, 53, 502/56

[56] References Cited

U.S. PATENT DOCUMENTS 3,812,652  5/1974  Carr et al. ................................. 55/48
4,962,272  10/1990  Cullo et al. ............................. 585/826

OTHER PUBLICATIONS

Database WPI, Section Ch, Derwent Publications Ltd., London, GB; Class A00, AN 68–38784Q XP002033156 & CA 824 718 A (Allied Chem Corp) Oct. 1965.

*Primary Examiner*—Michael Lewis
*Assistant Examiner*—Alexander G. Ghyka
*Attorney, Agent, or Firm*—Burns, Doane, Swecker & Mathis, L.L.P.

[57] ABSTRACT

Spent lead catalysts containing contaminating amounts of arsenic values, e.g., mixed oxides of lead and arsenic, are regenerated and rendered suitable for reuse by heat-treating same at a temperature of at least 550° C. in the presence of a gas mixture which comprises an inert gas, e.g., Ar, $N_2$ or He, and at least 2% by volume of at least one reducing gas, e.g., $H_2$, CO or $CH_4$.

13 Claims, No Drawings

REGENERATION OF SPENT AS-POISONED LEAD CATALYSTS

BACKGROUND OF THE INVENTION

1. Technical Field of the Invention:

The present invention relates to the treatment of spent catalysts contaminated or poisoned with arsenic in order to regenerate them and render them suitable for reuse.

2. Description of the Prior Art:

The treatment of contaminated spent products is an activity which today is becoming increasingly important. Environmental restrictions are resulting in the purification of all types of liquid, solid or gas with the goal of diminishing their levels of pollutants and preventing discharge of same to the environment.

Many catalysts have been developed for the purpose of removing the aforesaid impurities by absorption, adsorption or chemical reactions. However, once the contaminated products have been purified, the impurities exist at high concentrations in the catalysts, which must then be stored or destroyed.

There currently is a tendency to treat these spent catalysts to remove the impurities therefrom. This treatment targets, on the one hand, recovering impurities, in order to profit therefrom or to convert them into a form which can be easily stored, and, on the other, regenerating the spent catalysts in order to reuse them. This second aspect, in addition, permits savings, since it is not necessary to repurchase another charge of fresh catalyst.

Arsenic plays an important role among the impurities which are particularly harmful to the environment. In particular, it is present in gases, such as cracked gases resulting from steam cracking. One means for removing arsenic from these gases is to contact same with a catalyst based on a lead compound, for example a supported catalyst having an active phase based on a lead compound, for example lead oxide.

The arsenic present in the gases reacts on contact with these catalysts to form an arsenic compound, in particular a mixed compound of lead and of arsenic, which remains ad/absorbed on the catalyst.

Spent catalysts comprising these arsenic compounds are presently destroyed or stored. In addition, a new charge of fresh catalyst must be employed in order to continue to treat the gases to be purified.

SUMMARY OF THE INVENTION

A major object of the present invention is the provision of an improved process for the treatment of spent catalysts of the above type which makes it possible not only to remove the arsenic values therefrom, but also to regenerate the starting active phase of said catalyst, permitting reuse thereof for the same application without having to redeposit an active phase thereon.

Briefly, the present invention features a process for the treatment of a supported catalyst having an active phase based on a lead compound and which is contaminated with an arsenic compound, comprising heating said catalyst at a temperature of at least 500° C. in the presence of a gas mixture comprising at least 2% by volume of at least one reducing gas, the remainder being constituted by an inert gas.

DETAILED DESCRIPTION OF BEST MODE AND SPECIFIC/PREFERRED EMBODIMENTS OF THE INVENTION

More particularly according to the present invention, featured is a process for the treatment of a supported catalyst having an active phase based on a lead compound and which is contaminated with an arsenic compound, comprising heating said catalyst at a temperature of at least 500° C. in the presence of a gas mixture which comprises at least 2% by volume of at least one reducing gas, the remainder being an inert gas.

The reducing gas is advantageously selected from among $H_2$, $CO$, $CH_4$ or any other reducing gas.

The inert gas is advantageously selected from among Ar, $N_2$ or He.

The treatment temperature generally ranges from 550° C. to 1,000° C., preferably from 700° C. to 900° C.

The residence time can vary widely. It preferably ranges from 1 to 15 hours.

Similarly, the sweeping flow rate of the gas mixture can vary widely and preferably ranges from 0.1 to 10 liters/hour/gram of catalyst.

The arsenic compound evolved during the treatment is removed in the gaseous form. These vapors can be recovered by any means known to this art; for example, they can be condensed in the form of metallic arsenic.

The catalyst can be heated in any type of furnace, but a tubular furnace or a stationary furnace is preferably employed.

The process according to the invention is particularly well suited for treating a supported catalyst having an active phase based on lead oxide. The amount of this compound in the catalyst to be treated can also vary widely. It can be as high as 22% by weight with respect to the total weight of the catalyst. This type of catalyst is poisoned with the arsenic in the form of a mixed oxide of lead and of arsenic.

The supported catalyst may include, for example, an inorganic support based on alumina, on silica, on silica/alumina or on charcoal.

For example, it can be the catalyst MEP 191 marketed by Procatalyse.

The removal of the arsenic is monitored by analysis using various techniques known for the quantitative determination of arsenic, in particular atomic absorption.

A primary advantage presented by the process according to the invention is that not only is the arsenic removed from the catalyst, but also the active phase of the catalyst is regenerated and the support exhibits the same characteristics as when it was used initially.

In order to further illustrate the present invention and the advantages thereof, the following specific examples are given, it being understood that same are intended only as illustrative and in nowise limitative.

EXAMPLE 1

The starting catalyst was an MEP 191 catalyst marketed by Procatalyse exhibiting the following characteristics:

Support:
(a) alumina
(b) specific surface: 115 $m^2/g$

Active phase:
(a) Pbo
(b) content: 23% by weight with respect to the catalyst

This catalyst was utilized in a unit for removing arsenic from a natural gas. After the gas had been treated, the catalyst comprised 1.6% by weight of arsenic with respect to the total weight of the catalyst.

The catalyst was removed from the unit in order to be treated according to the process of the invention.

Procedure:

20 g of spent catalyst were introduced into a tubular furnace.

The temperature was increased to 100° C. at the rate of 5° C. per minute while sweeping the furnace with argon, introduced at a flow rate of 3 liters/hour/gram of catalyst.

A gaseous mixture of argon and of hydrogen (2.5% by volume of hydrogen) was then introduced. The flow rate of the mixture was 3 liters/hour/gram of catalyst.

This treatment was carried out for 5 h at 700° C.

Results:

(i) content of arsenic: 0.14% by weight with respect to the catalyst, i.e., a removal of the arsenic of greater than 90%, (ii) content of the active phase PbO: 22.4% by weight with respect to the catalyst, (iii) specific surface: 94 m$^2$/g.

EXAMPLE 2

The procedure of Example 1 was repeated, except that the treatment temperature was 590° C. instead of 700° C.

Results:

(i) content of arsenic: 0.5% by weight with respect to the catalyst, i.e., a removal of the arsenic of 70%, (ii) content of the active phase PbO: 21.2% by weight with respect to the catalyst, (iii) specific surface: 109 m$^2$/g.

EXAMPLE 3 (Comparative)

The procedure of Example 1 was repeated, except that the treatment gas comprised only argon; no reducing gas was added thereto.

Results:

(i) content of arsenic: 1.46% by weight with respect to the catalyst, i.e., a removal of the arsenic of less than 9%, (ii) content of the active phase PbO: 21.9% by weight with respect to the catalyst, (iii) specific surface: 76 m$^2$/g.

EXAMPLE 4 (Comparative)

The procedure of Example 1 was repeated, except that the temperature during the treatment was 420° C. (less than 550° C.) and not 700° C.

Results:

(i) content of arsenic: 1.26% by weight with respect to the catalyst, i.e., a removal of the arsenic on the order of 20%, (ii) content of the active phase PbO: 22.2% by weight with respect to the catalyst, (iii) specific surface: 108 m$^2$/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for regenerating a spent lead catalyst containing contaminating amounts of arsenic values, comprising heat-treating said spent catalyst at a temperature of at least 550° C. in the presence of a gas mixture which comprises an inert gas and at least 2% by volume of at least one reducing gas.

2. The process as defined by claim 1, said at least one reducing gas comprising H$_2$, CO or CH$_4$.

3. The process as defined by claim 2, said at least one reducing gas comprising H$_2$.

4. The process as defined by claim 1, said inert gas comprising Ar, N$_2$ or He.

5. The process as defined by claim 1, carried out at a temperature ranging from 550° C. to 1,000° C.

6. The process as defined by claim 1, carried out for from 1 to 15 hours.

7. The process as defined by claim 1, comprising sweeping said spent catalyst with said gas mixture at a flow rate ranging from 0.1 to 10 liters/hour/gram of catalyst.

8. The process as defined by claim 1, further comprising condensing vapors of said contaminating arsenic values as metallic arsenic.

9. The process as defined by claim 1, carried out in a tubular or stationary furnace.

10. The process as defined by claim 1, said lead catalyst comprising a catalytically active lead phase deposited onto an inorganic support substrate.

11. The process as defined by claim 10, said catalytically active phase comprising lead oxide.

12. The process as defined by claim 10, said inorganic support substrate comprising alumina, silica, silica/alumina or charcoal.

13. The process as defined by claim 1, said contaminating arsenic values comprising a mixed oxide of lead and arsenic.

* * * * *